(12) United States Patent
Li et al.

(10) Patent No.: US 10,238,147 B2
(45) Date of Patent: Mar. 26, 2019

(54) ATOMIZER AND ELECTRONIC CIGARETTE HAVING SAME

(71) Applicant: Shenzhen First Union Technology Co., Ltd., Shenzhen, Guangdong Province (CN)

(72) Inventors: Yonghai Li, Shenzhen (CN); Zhongli Xu, Shenzhen (CN); Changzheng Dai, Shenzhen (CN)

(73) Assignee: SHENZHEN FIRST UNION TECHNOLOGY CO., LTD., Shenzhen, Guangdong Province (CN)

( * ) Notice: Subject to any disclaimer, the term of this patent is extended or adjusted under 35 U.S.C. 154(b) by 232 days.

(21) Appl. No.: 15/243,803

(22) Filed: Aug. 22, 2016

(65) Prior Publication Data

US 2016/0366943 A1 Dec. 22, 2016

(30) Foreign Application Priority Data

Sep. 10, 2015 (CN) .................... 2015 2 0695951 U

(51) Int. Cl.
*A24F 47/00* (2006.01)
*F16L 37/40* (2006.01)

(52) U.S. Cl.
CPC ............ *A24F 47/008* (2013.01); *F16L 37/40* (2013.01)

(58) Field of Classification Search
CPC ............................. A24F 47/008; F16L 37/40
USPC ......................................................... 131/329
See application file for complete search history.

(56) References Cited

U.S. PATENT DOCUMENTS

| 3,711,817 A * | 1/1973 | Carter ................. H01R 13/514 439/272 |
| 6,616,639 B2 * | 9/2003 | Gagnieux ............. A61M 5/326 604/192 |
| 8,528,569 B1 * | 9/2013 | Newton ................ A61M 15/06 128/202.21 |
| 9,980,517 B2 * | 5/2018 | Zhu ....................... A24F 47/008 |

(Continued)

FOREIGN PATENT DOCUMENTS

| CN | 103300480 A * | 9/2013 | ........... A24F 47/008 |
| WO | WO-2016202303 A1 * | 12/2016 | ............. A24F 47/00 |

OTHER PUBLICATIONS

Machine translation of CN 103300480 A (Year: 2013).*
Machine translation of WO 2016202303 (Year: 2016).*

*Primary Examiner* — Eric Yaary
*Assistant Examiner* — Russell E Sparks
(74) *Attorney, Agent, or Firm* — Cheng-Ju Chiang

(57) ABSTRACT

The present disclosure relates to an atomizer for an electronic cigarette. The atomizer includes a housing, a mouthpiece, a liquid tank, an atomizing cup, an atomizing assembly, an air pipe. The atomizer further includes a movable element and an elastic element. When the mouthpiece is connected to the housing, the mouthpiece abuts against the air pipe, and drives the air pipe and the movable element to compress the elastic element axially, so that the at least one through hole is in communication with the at least one liquid inlet, and the atomizing assembly absorbs the tobacco liquid flowed from the at least one through hole. When the mouthpiece is detached from the housing, the air pipe and the movable element are driven by the elastic element to restore to an initial position where the at least one through hole is misaligned with the at least one liquid inlet.

11 Claims, 8 Drawing Sheets

(56) References Cited

U.S. PATENT DOCUMENTS

| | | | |
|---|---|---|---|
| 2011/0304282 A1* | 12/2011 | Li | A24F 47/008 |
| | | | 315/362 |
| 2016/0021930 A1* | 1/2016 | Minskoff | A61M 15/06 |
| | | | 131/329 |
| 2016/0227841 A1* | 8/2016 | Li | A61M 15/06 |
| 2017/0013880 A1* | 1/2017 | O'Brien | A24F 47/008 |
| 2018/0049470 A1* | 2/2018 | Chen | A24F 47/008 |

\* cited by examiner though holes 361 in a sidewall. The connecting end 342 defines a
ATOMIZER AND ELECTRONIC CIGARETTE HAVING SAME

TECHNICAL FIELD

The present invention relates to electronic cigarettes, and particularly to an atomizer and an electronic cigarette using same.

BACKGROUND ART

A typical electronic cigarette includes a liquid absorbing element and a heating element in the atomizing chamber. The liquid absorbing element extends out of the atomizing chamber to absorb tobacco liquid. However, the liquid absorbing element may absorb too much tobacco liquid, and the tobacco liquid may leak when the atomizer shakes.

What are needed, therefore, are an atomizer and an electronic cigarette using same, which can overcome the above shortcomings.

SUMMARY

The present disclosure relates to an atomizer for an electronic cigarette. The atomizer includes a housing, a mouthpiece, a liquid tank, an atomizing cup, an atomizing assembly, an air pipe. The atomizer further includes a movable element and an elastic element. When the mouthpiece is connected to the housing, the mouthpiece abuts against the air pipe, and drives the air pipe and the movable element to compress the elastic element axially, so that the at least one through hole is in communication with the at least one liquid inlet, and the atomizing assembly absorbs the tobacco liquid flowed from the at least one through hole. When the mouthpiece is detached from the housing, the air pipe and the movable element are driven by the elastic element to restore to an initial position where the at least one through hole is misaligned with the at least one liquid inlet.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
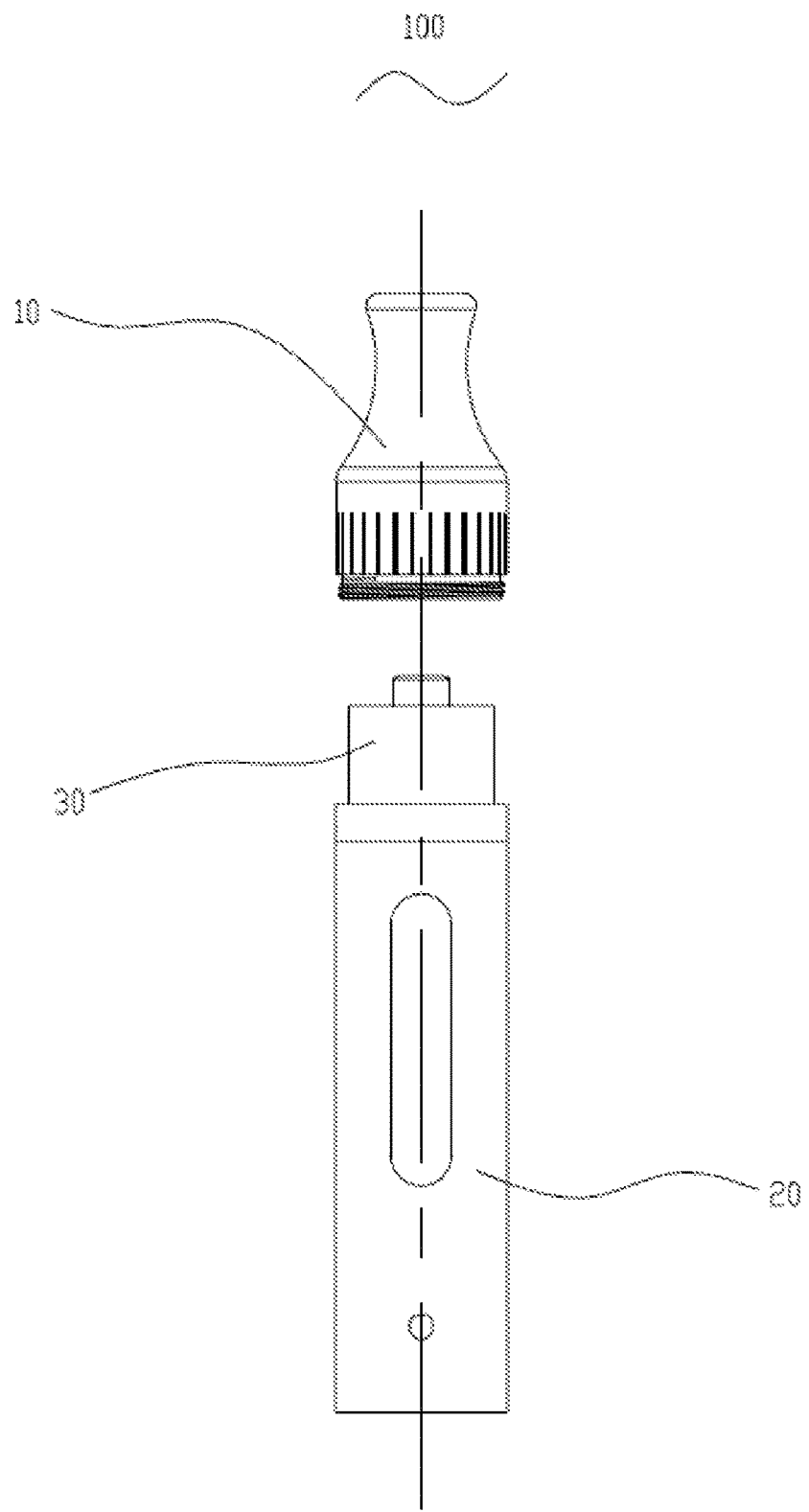
FIG. 1 is a side view of an atomizer according to a first embodiment, including a movable element, an atomizing cup, and a liquid tank.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Several definitions that apply throughout this disclosure will now be presented.

The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
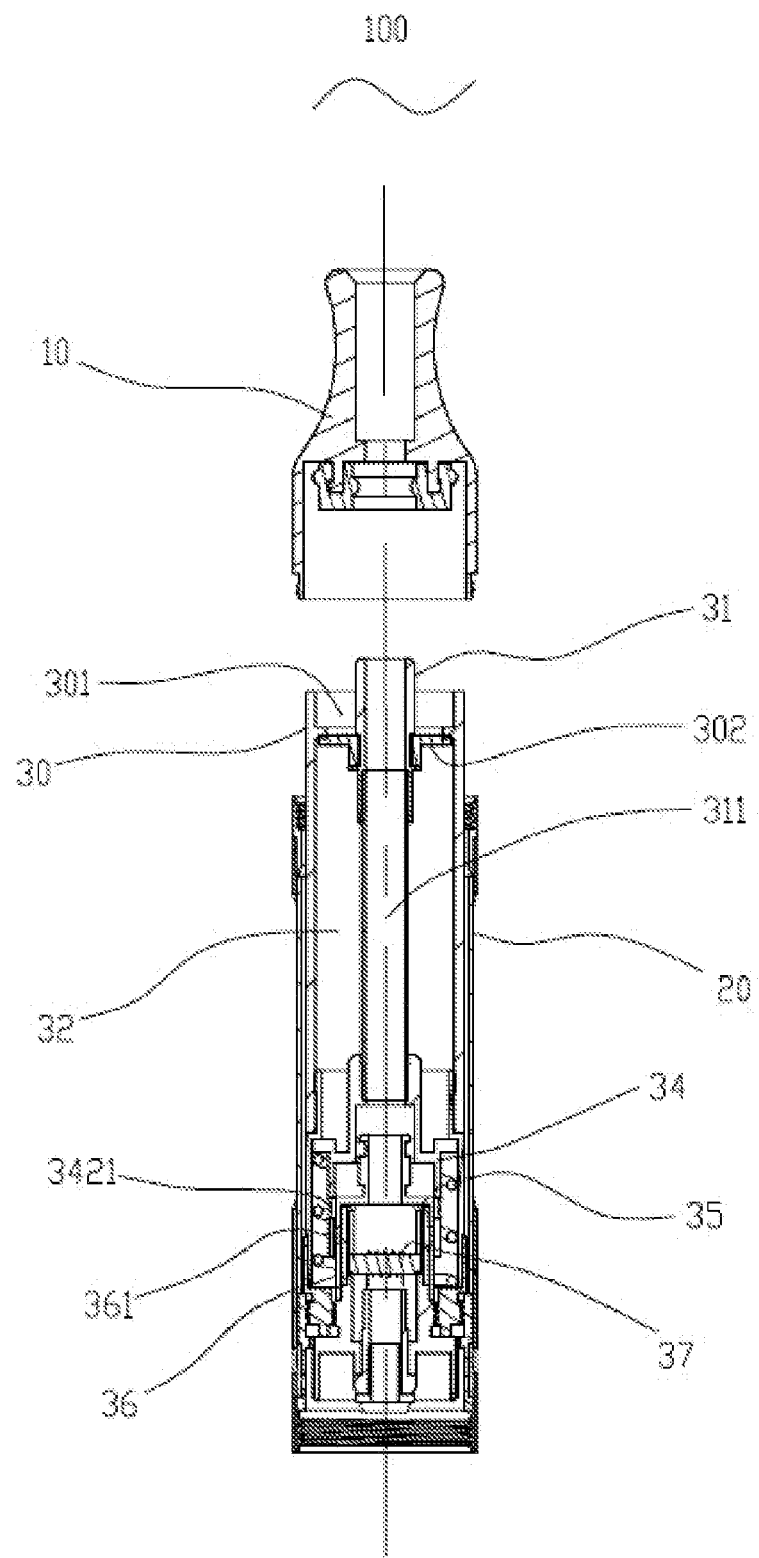
FIG. 2 is a side cross-sectional view of the atomizer of FIG. 1.

Referring to FIGS. 1-2, an atomizer 100 for an electronic cigarette is shown. The atomizer 100 includes a housing 20, a mouthpiece 10 detachably connected with the housing 20, and a liquid tank 30 in the housing 20. The liquid tank 30 defines a liquid chamber 32 for storing tobacco liquid, and includes an atomizing chamber 362, an atomizing assembly 37 in the atomizing chamber 362, and an air pipe 31 communicating the atomizing chamber 362 and the mouthpiece 10. The atomizing chamber 362 is defined by an atomizing cup 36, and is separated from the liquid chamber 32 by the atomizing cup 36. The atomizing assembly 37 is configured (i.e., structured and arranged) for generating aerosol from the tobacco liquid. The aerosol is expelled from the mouthpiece 10 through a path 311 defined inside the air pipe 31.

Figure 3:
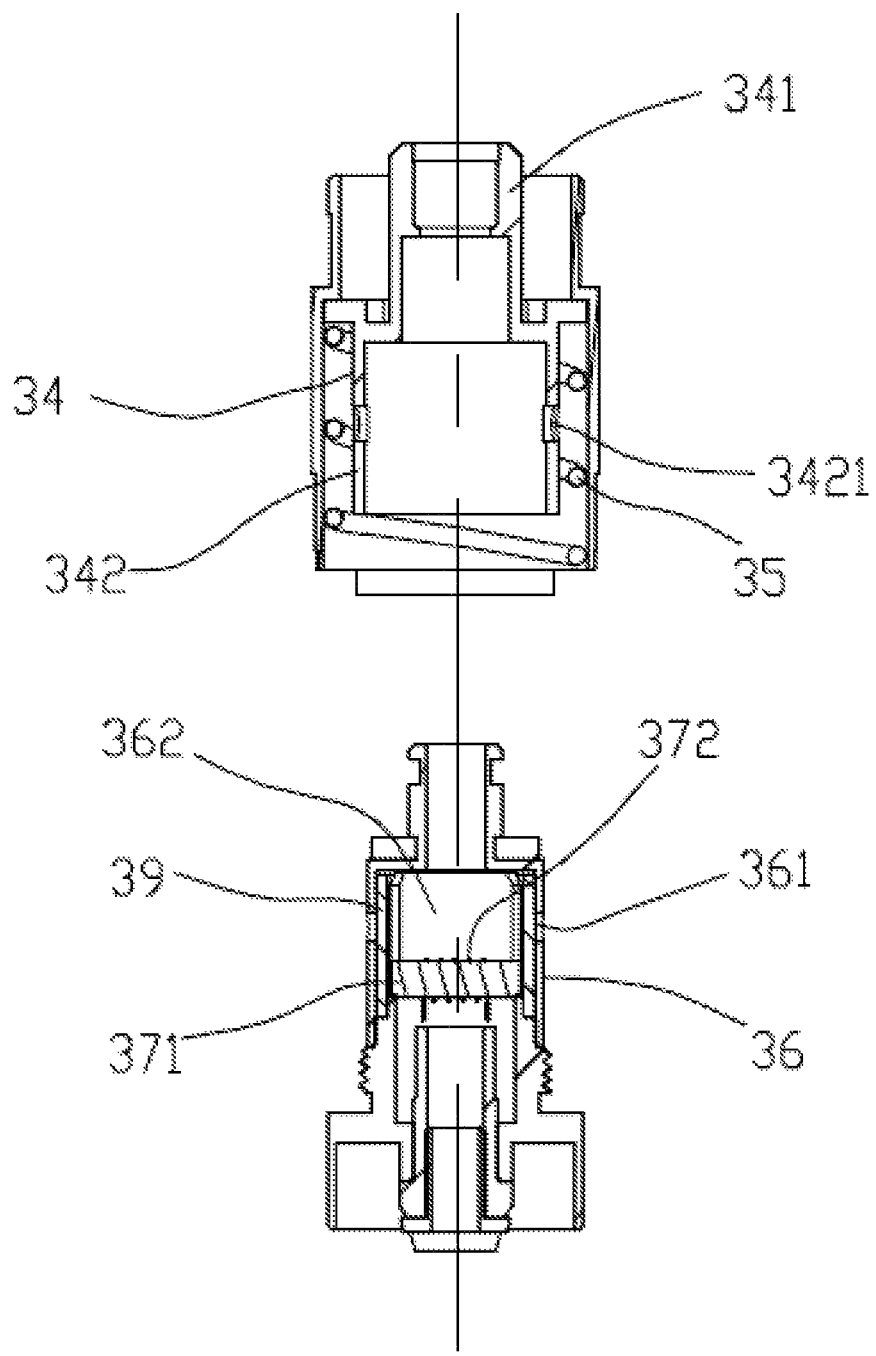
FIG. 3 is an exploded view of the movable element and the atomizing cup.
Figure 4:
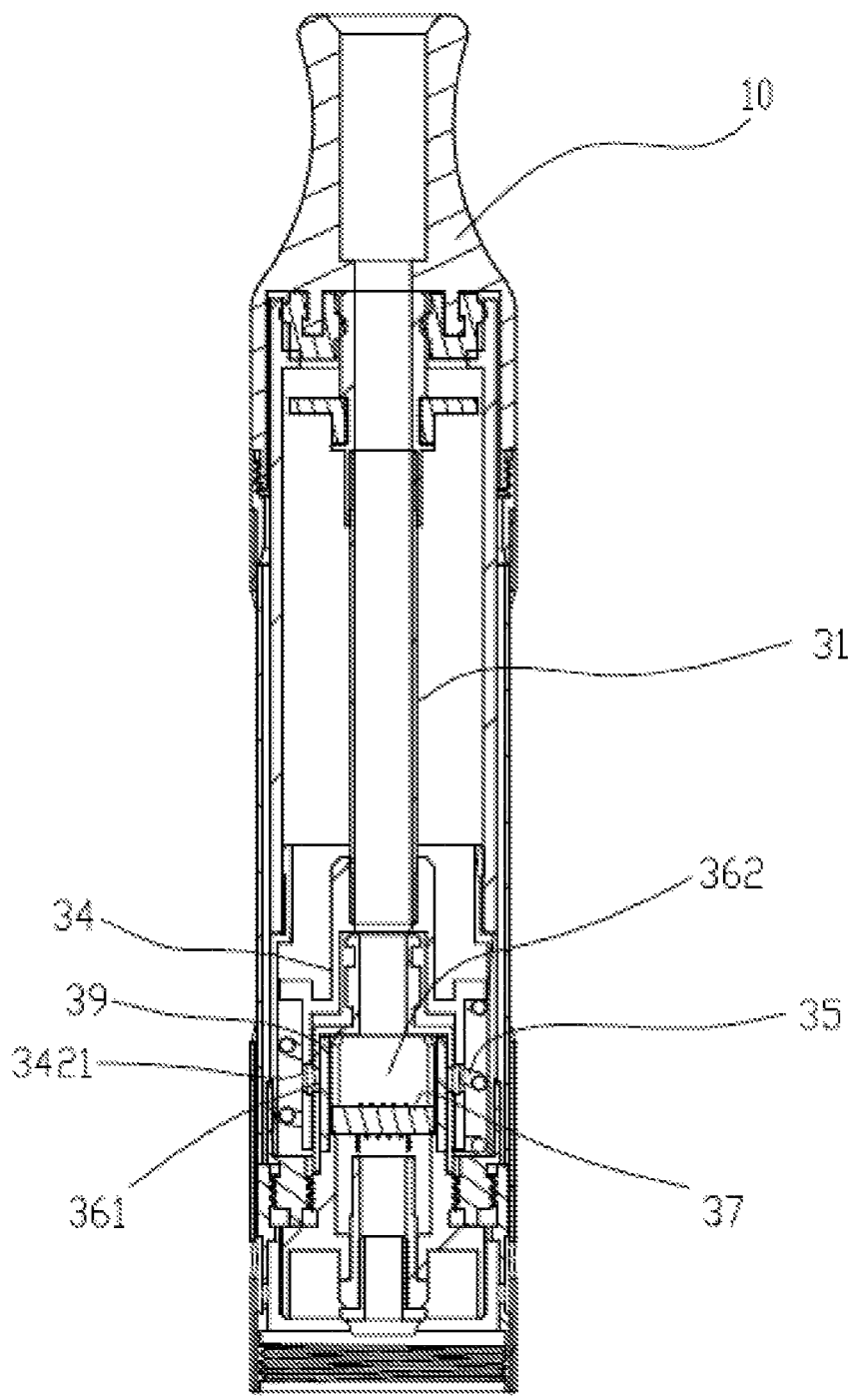
FIG. 4 is an assembled view of the atomizer of FIG. 1.
Figure 5:
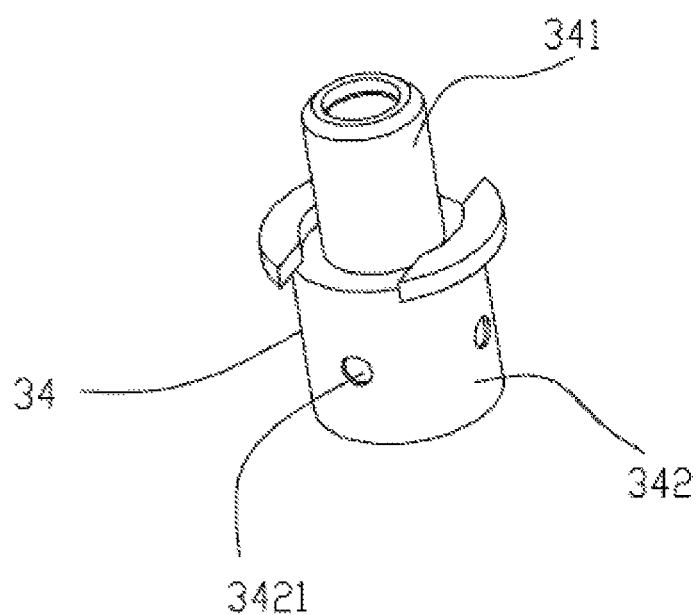
FIG. 5 is a perspective view of the movable element.

Referring to FIGS. 2, 3 and 5, a movable element 34 and an elastic element 35 are arranged in the liquid chamber 32. The movable element 34 includes a fixing end 341 and a connecting end 342. The fixing end 341 is connected with an end of the air pipe 31, and the connecting end 342 sleeves an external surface of the atomizing cup 36. The elastic element 35 nests an external surface of the connecting end 342. The atomizing cup 36 defines a plurality of through holes 361 in a sidewall. The connecting end 342 defines a plurality of liquid inlets 3421 matching with the through holes 361. Referring to FIG. 4, when the mouthpiece 10 is connected with the housing 20, the mouthpiece 10 abuts against the air pipe 31, and drives the air pipe 31 and the movable element 34 to compress the elastic element 35 along an axial direction of the atomizer 100 so that each through hole 361 is in communication with a respect liquid inlet 3421. In this position, the tobacco liquid in the liquid chamber 32 flows into the atomizing chamber 362 via the liquid inlets 3421 and the through hole 361, and then the atomizing assembly 37 absorbs the tobacco liquid for atomization. When the mouthpiece 10 is detached from the housing 20, the air pipe 31 and the movable element 34 are driven by an elastic force of the elastic element 35 to restore to an initial position. In this position, the liquid inlets 3421 and the through hole 361 are in misalignment with each other, and the tobacco liquid in the liquid chamber 32 cannot flow into the atomizing chamber 362.

Referring to FIG. 3, in the present embodiment, a liquid storing layer 39 is arranged in the atomizing chamber 362, and is tightly attached to an inner surface of the atomizing cup 36. The liquid storing layer 39 is configured for absorbing the tobacco liquid flowed from the through holes 361. The atomizing assembly 37 then absorbs the tobacco liquid reserved in the liquid storing layer 39. The atomizing assembly 37 includes a liquid absorbing element 371 and a heating element 372. Two opposite ends of the liquid absorbing element 371 are both in contact with the liquid storing layer 39. The heating element 372 is in contact with the liquid absorbing element 371. In the present embodiment, the heating element 372 is oriented in a direction substantially perpendicular to the axial direction of the atomizer 100. The liquid storing layer 39 may be made of glass fiber or ceramic material. It is to be understood that, in other embodiments, when the liquid storing layer 39 is omitted, the liquid absorbing element 371 can extend into the through holes 361.

Referring to FIG. 2, the liquid tank 30 includes a liquid injecting opening 301 at an end adjacent to the mouthpiece 10. A valve 302 is provided in the liquid injecting opening 301, and is configured for sealing the liquid injecting opening 301. The valve 302 can be pushed open by an external liquid injector, so that tobacco liquid can be injected into the liquid chamber 32. When the injector is moved out from the liquid injecting opening 301, the valve 302 can restore to its original shape to seal the liquid injecting opening 301.

Figure 6:
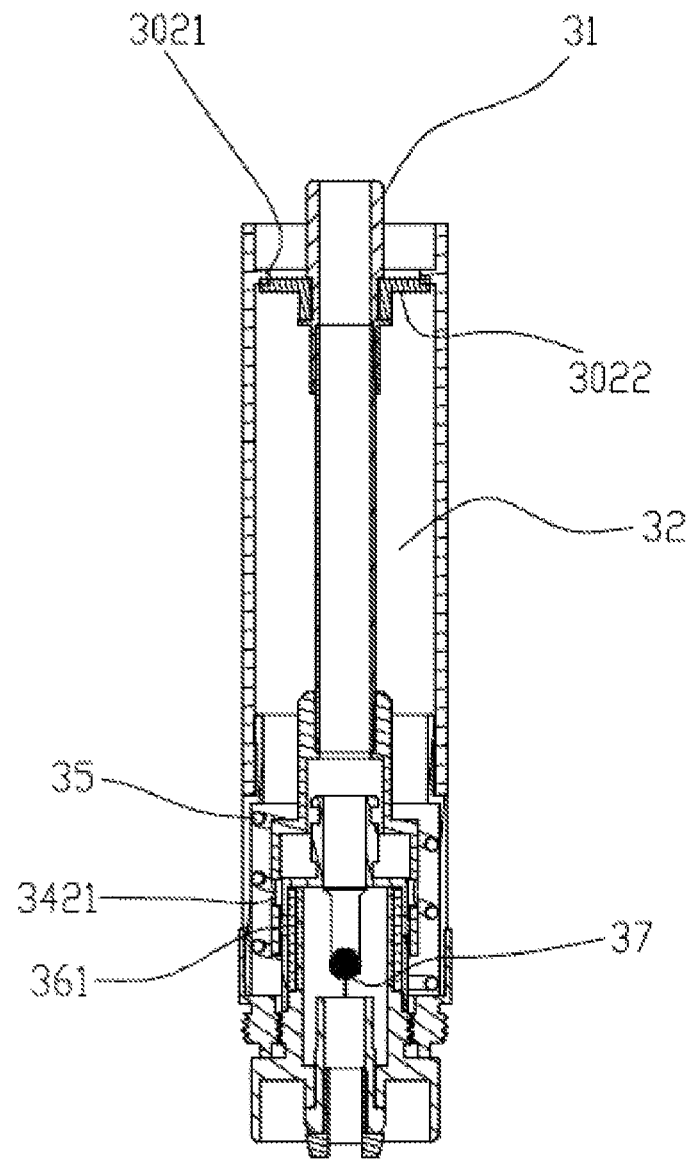
FIG. 6 is a side cross-sectional view of a liquid tank.

In the present embodiment, referring to FIG. 6, the valve 302 includes a protrusion 3021 and an elastic piece 3022. The protrusion 3021 is formed on an inner surface of the liquid tank 30. The elastic piece 3022 abuts against the protrusion 3021. The elastic piece 3022 nests the air pipe 31. The elastic piece 3022 may be made of rubber or silicone. To prevent liquid leakage after the elastic piece 3022 is moved downwards, an edge of the elastic piece 3022 may tightly abuts against an inner wall of the liquid tank 30.

In the present embodiment, since the liquid absorbing element 371 is not in contact with the tobacco liquid in the liquid chamber 32 for a long time, the atomizing assembly 37 will not absorb too much tobacco liquid, thus avoiding liquid leakage.

Figure 7:
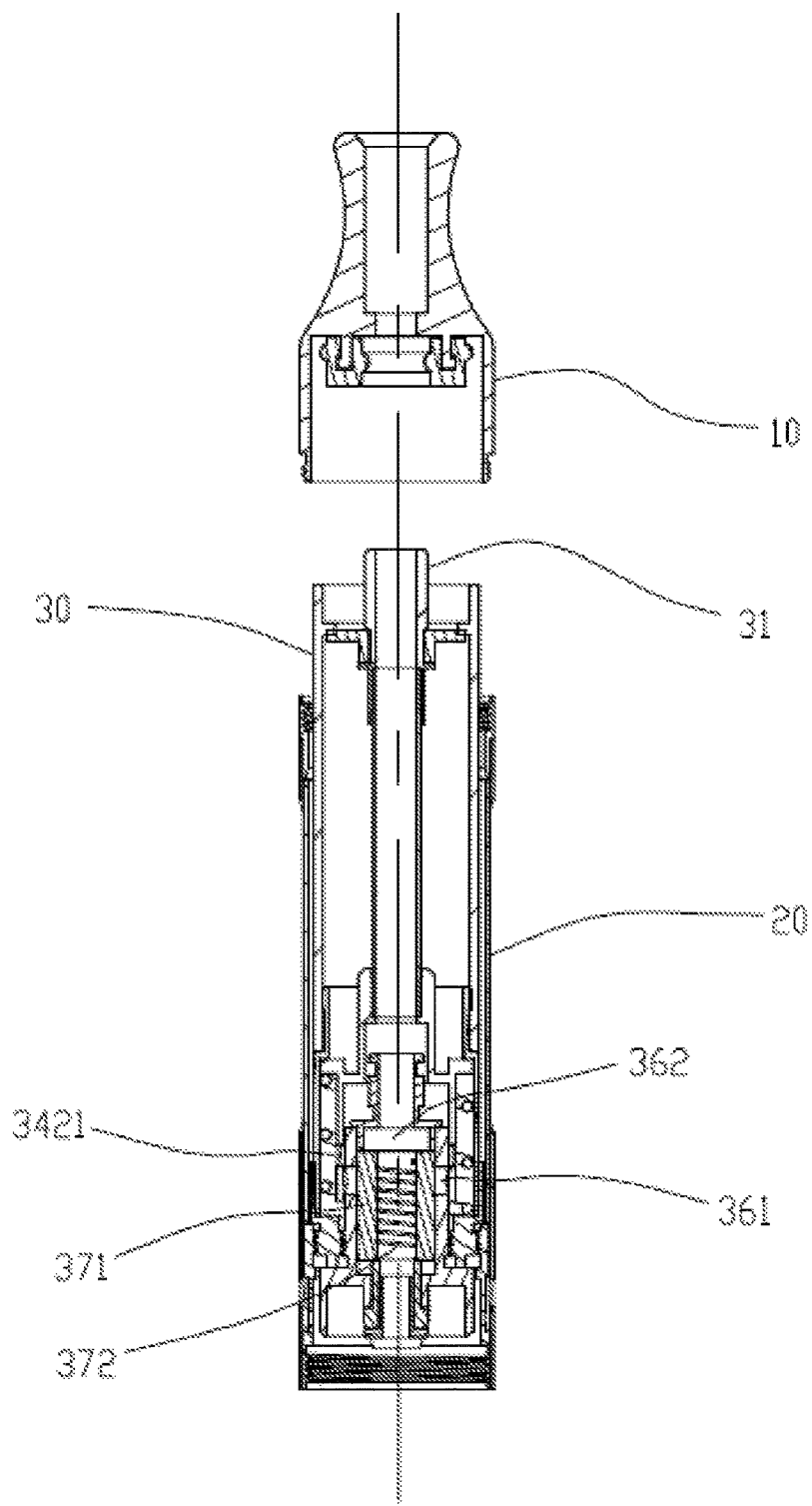
FIG. 7 is a side cross-sectional view of an atomizer according to a second embodiment.

It is to be noted that in an alternative embodiment, referring to FIG. 7, the heating element 372 may be oriented in a direction parallel to the axial direction of the atomizer 100. In this case, the liquid absorbing element 371 may be in tight contact with the inner wall of the atomizing cup 36; alternatively, the liquid absorbing element 371 may be in tight contact with the liquid storing layer 39. The liquid absorbing element 371 may be made of glass fiber or ceramic material.

Figure 8:
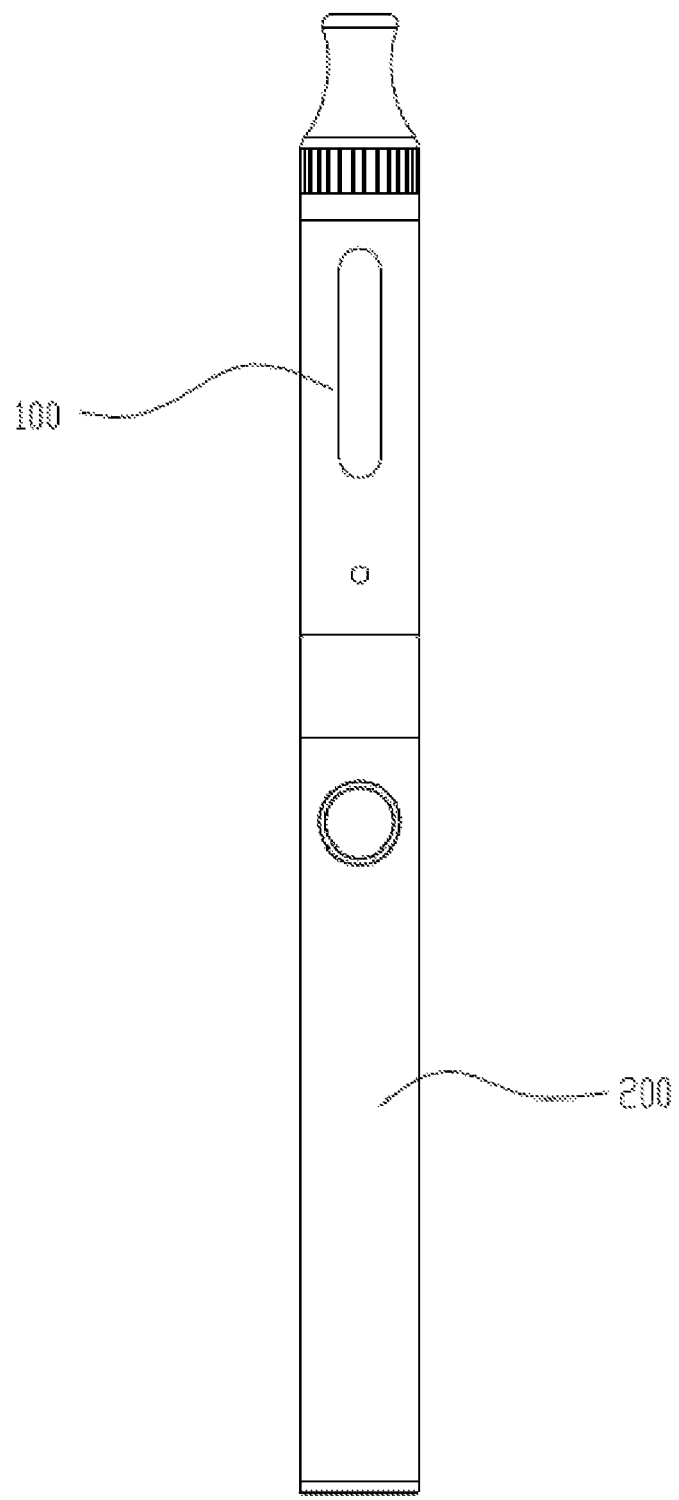
FIG. 8 is a side view of an electronic cigarette according to a third embodiment.

Referring to FIG. 8, an electronic cigarette is shown. The electronic cigarette includes the atomizer 100 and a power supply 200. The atomizer 100 and the power supply 200 are coupled by screw threads. The power supply 200 is configured for feeding the atomizer 100 power.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An atomizer for an electronic cigarette, comprising:
    a housing;
    a mouthpiece detachably connected with the housing;
    a liquid tank in the housing, the liquid tank defining a liquid chamber configured for storing tobacco liquid;
    an atomizing cup in the liquid tank, the atomizing cup defining an atomizing chamber;
    an atomizing assembly in the atomizing chamber, the atomizing assembly being configured for generating aerosol from the tobacco liquid; and
    an air pipe communicating the atomizing chamber and the mouthpiece;
    wherein the atomizer further comprises a movable element and an elastic element, the movable element has a fixing end and a connecting end, the fixing end is connected with the air pipe, the connecting end nests an exterior surface of the atomizing cup, the elastic element nests an exterior surface of the connecting end;
    the atomizing cup comprises a sidewall defining at least one through hole, the connecting end defines at least one liquid inlet;
    when the mouthpiece is connected to the housing, the mouthpiece abuts against the air pipe, and drives the air pipe and the movable element to compress the elastic element axially, so that the at least one through hole is in communication with the at least one liquid inlet, and the atomizing assembly absorbs the tobacco liquid flowed from the at least one through hole; and
    when the mouthpiece is detached from the housing, the air pipe and the movable element are driven by the elastic element to restore to an initial position where the at least one through hole is misaligned with the at least one liquid inlet, the tobacco liquid cannot flow into the at least one liquid inlet.

2. The atomizer according to claim 1, further comprising a liquid storing layer in the atomizing chamber, wherein the liquid storing layer is attached to an inner wall of the atomizing cup, the liquid storing layer is configured for absorbing tobacco liquid flowed from the at least one through hole, and the atomizing assembly is configured for absorbing the tobacco liquid in the liquid storing layer for atomization.

3. The atomizer according to claim 2, wherein the liquid storing layer is made of glass fiber or ceramic material.

4. The atomizer according to claim 1, wherein the atomizing assembly comprises a liquid absorbing element and a heating element, and the heating element is in contact with the liquid absorbing element.

5. The atomizer according to claim 4, wherein the heating element is oriented in a direction substantially parallel to an axial direction of the atomizer, and the liquid absorbing element is attached to an inner wall of the atomizing cup.

6. The atomizer according to claim 4, wherein the heating element is oriented in a direction substantially perpendicular to an axial direction of the atomizer, and the liquid absorbing element extends into the at least one through hole.

7. The atomizer according to claim 4, wherein the liquid absorbing element is made of glass fiber or ceramic material.

8. The atomizer according to claim 1, wherein the liquid tank defines a liquid injecting opening at an end adjacent to the mouthpiece, the atomizer further comprises a valve in the liquid injecting opening, the valve is configured for sealing the liquid injecting opening; the valve is capable of being pushed open by an external liquid injector, so that tobacco liquid can be injected into the liquid chamber; when the injector is moved out from the liquid injecting opening, the valve is capable of restoring to its original shape to seal the liquid injecting opening.

9. The atomizer according to claim 8, wherein the valve comprises a protrusion and an elastic piece, the protrusion is formed on an inner surface of the liquid tank, the elastic piece abuts against the protrusion, the elastic piece nests the air pipe.

10. The atomizer according to claim 9, wherein the elastic piece is made of rubber or silicone.

11. An electronic cigarette, comprising:
an atomizer according to claim 1; and
a power supply configured for feeding the atomizer power.

* * * * *